US008811282B2

(12) United States Patent
Boulos et al.

(10) Patent No.: US 8,811,282 B2
(45) Date of Patent: Aug. 19, 2014

(54) CALL DELIVERY TO AN IMS NETWORK FOR A MOBILE DIRECTORY NUMBER HOMED IN A 2G WIRELESS NETWORK

(75) Inventors: Pierre Boulos, Richardson, TX (US); Marvin Bienn, Dallas, TX (US); David Brombal, Plano, TX (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 229 days.

(21) Appl. No.: 13/172,152

(22) Filed: Jun. 29, 2011

(65) Prior Publication Data
US 2012/0243471 A1 Sep. 27, 2012

Related U.S. Application Data

(60) Provisional application No. 61/466,543, filed on Mar. 23, 2011.

(51) Int. Cl.
*H04W 4/00* (2009.01)

(52) U.S. Cl.
USPC .......................................................... 370/328

(58) Field of Classification Search
CPC ... H04L 65/403; H04L 12/12; H04L 12/1403; H04L 12/58; H04L 51/04; H04L 51/10; H04L 63/08; H04L 63/10; H04L 63/102; H04L 65/1016; H04L 65/60; H04L 67/16; H04L 67/24; H04L 67/2842; H04M 1/274583; H04M 1/2535; H04M 1/274508; H04M 1/274516; H04M 1/274566; H04M 1/274575; H04M 1/56; H04M 1/72544; H04M 1/72552; H04M 1/72558; H04M 1/72572; H04M 1/72577; H04M 1/72583; H04M 2203/652; H04M 2250/60; H04M 3/42382; H04M 3/46; H04M 3/4931; H04M 3/4938; H04W 4/005; H04W 16/14; H04W 28/0205; H04W 28/06; H04W 36/0022; H04W 36/04; H04W 36/10; H04W 36/24
See application file for complete search history.

(56) References Cited

U.S. PATENT DOCUMENTS

2002/0024943 A1* 2/2002 Karaul et al. ................. 370/338
2006/0142011 A1* 6/2006 Kallio ........................... 455/445
(Continued)

OTHER PUBLICATIONS

3GPP2 X.S0004-540-E v2.0, Mobile Application Part (MAP)—Operations Signaling Protocols, Aug. 2007.
(Continued)

*Primary Examiner* — Chi Pham
*Assistant Examiner* — Raul Rivas (57) ABSTRACT

A system and method to provide call delivery to an Internet Protocol Multimedia Subsystem (IMS) network for a Mobile Directory Number (MDN) homed in a second generation (2G) wireless network, without requiring Wireless Intelligent Network (WIN) operations and associated Mobile Switching Center emulation (MSCe) translations for routing the call request. A Home Location Register (HLR) determines whether the subscriber has subscribed to the IMS services. The HLR-based subscriber profile is enhanced with new IMS-related subscriber information. Enhanced American National Standards Institute-41 (ANSI-41) Mobile Application Part (MAP) operations and a new ANSI-41 parameter allow the MSCe to re-route the call origination request from a Public Switched Telephone Network (PSTN) to an entry point for the IMS network based upon the new IMS-related subscriber information received from the HLR. A Domain Name Server (DNS) supports routing-related traffic distribution.

21 Claims, 7 Drawing Sheets

(56) References Cited

U.S. PATENT DOCUMENTS

| | | | |
|---|---|---|---|
| 2009/0036122 A1* | 2/2009 | Lu et al. | 455/433 |
| 2009/0156253 A1* | 6/2009 | Shi et al. | 455/558 |
| 2010/0008353 A1* | 1/2010 | Li | 370/352 |
| 2010/0220667 A1* | 9/2010 | Noldus et al. | 370/329 |
| 2011/0032923 A1* | 2/2011 | Ho | 370/342 |
| 2011/0258300 A1* | 10/2011 | Hao et al. | 709/221 |

OTHER PUBLICATIONS

3GPP2 X.S0004-550-E v4.0, Mobile Application Part (MAP)—Parameters Signaling Protocols, Jan. 2010.

* cited by examiner

CALL DELIVERY TO AN IMS NETWORK FOR A MOBILE DIRECTORY NUMBER HOMED IN A 2G WIRELESS NETWORK

CROSS-REFERENCE TO RELATED APPLICATIONS

This application claims the priority benefit under 35 U.S.C. §119(e) of U.S. Provisional Application No. 61/466,543 filed Mar. 23, 2011, the disclosure of which is incorporated herein by reference in its entirety.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND

The present invention generally relates to call delivery in a wireless network. More particularly, and not by way of limitation, the present invention is directed to a system and method for routing a call request to an Internet Protocol Multimedia Subsystem (IMS) network for a Mobile Directory Number (MDN) homed on a network switch in a second generation (2G) wireless network.

Figure 1:
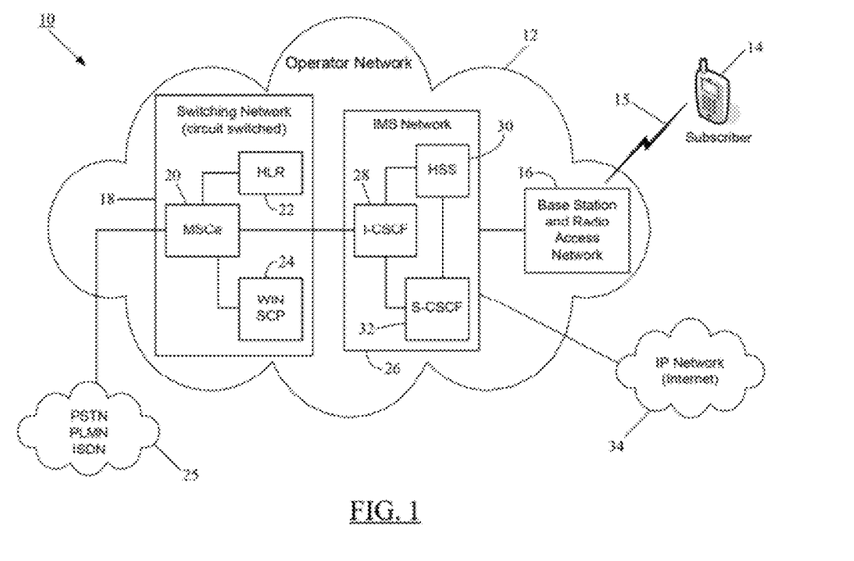
FIG. 1 (Prior Art) shows an exemplary wireless network architecture to implement the existing call delivery solution using Wireless Intelligent Network (WIN) operations.

FIG. 1 shows an exemplary wireless network architecture 10 to implement the existing call delivery solution using Wireless Intelligent Network (WIN) operations. The network architecture 10 in FIG. 1 shows a wireless operator (or carrier) network 12 providing wireless communication facility to deliver a call origination request to a subscriber 14 that has an IMS subscription. In the discussion herein, the reference numeral "14" is used interchangeably to refer to a "subscriber" or a subscriber's mobile device or terminal. A base station (which may be part of a Radio Access Network (RAN)) 16 may provide the air interface to the mobile terminal 14 to facilitate wireless communication with the terminal 14. The operator network 12 may also include a call switching or routing network 18 including a network switch (e.g., a Mobile Switching Center (MSC)) 20, a Home Location Register (HLR), and a WIN Service Control Point (SCP) 24. Various network elements in the switching network 18 may have circuit-switched connections therebetween. The MSC functionality may be divided so that the call control or mobility management and routing function may be implemented using a Mobile Switching Center emulation (MSCe), whereas the bearer resources may be supported using a Media Gateway (MGW) or an MGW Media Resource Function Processor (MGW-MRFP) (not shown). Because of the focus of the present discussion on the routing aspects in the network 12, the reference numeral "20" is used to refer to the MSCe as the network switch in the operator network 12 for the sake of simplicity and ease of discussion. As is known, the HLR 22 may contain a database (not shown) for storing subscriber-specific information such as, for example, the subscriber's Mobile Equipment Identifier (MEID), the subscriber's Mobile Directory Number (MDN), the address of the subscriber's "home" or "registered" location, the class of services subscribed by the subscriber, etc. The WIN SCP 24 may provide service control functionality through routing support as discussed later with reference to FIG. 2.

The carrier network 12 may be a wireless network such as a Time Division Multiple Access (TDMA) based network, a Code Division Multiple Access (CDMA) network, or a cdma2000® network.

The network switch 20 may be in communication with a wireline network 25 (e.g., a Public Switched Telephone Network (PSTN), a Public Land Mobile Network (PLMN), or an Integrated Services Digital Network (ISDN)) to receive the calls for the subscriber 14 routed through the wireline network 25. For ease of discussion below, the term "PSTN" is primarily used with the reference numeral "25" while describing the call delivery mechanisms with reference to FIGS. 2 through 5.

The network switch 20 also may be in communication with an IP Multimedia Subsystem (IMS) network 26, which may be deployed by the operator of the wireless network 12 to provide support for multimedia services (e.g., texting, audio-visual content delivery, Internet or website access, etc.) to the subscribers in the network 12. Thus, in the network topology of FIG. 1, the IMS-capable subscriber terminal 14 may access the IMS network 26 through the base station 16. Although the IMS network 26 is shown as a part of the operator's wireless network 12, such IMS network 26 may be a separate network associated with the wireless network 12, or the IMS network 26 may be in another operator's network. The IMS network may provide multimedia sessions between an end-user terminal (e.g., the MS 14) and PSTN 25 or between PSTN 25 and Internet Protocol (IP) multimedia servers and content providers (not shown). The IMS network 26 may support multimedia sessions using the Session Initiation Protocol (SIP) and Session Description Protocol (SDP) to set up and control calls/sessions. Several roles of SIP servers or proxies, collectively called Call Session Control Functions (CSCF), may be used in the IMS network 26 to process SIP signaling packets in the IMS network 26. Thus, the IMS network 26 may include an Interrogating Call Session Control Function (I-CSCF) 28 as an "entry point" or "point of contact" located at the edge of the network 26. The I-CSCF 28 may receive a call (e.g., a voice and/or a data call) in the form of a SIP request routed thereto from the MSCe 20 (as discussed below with reference to FIG. 2), and may query a Home Subscriber Server (HSS) 30 to retrieve the address of a Serving-CSCF (S-CSCF) 32 and assign it to the IMS user (e.g., the subscriber 14) performing an IMS registration. The I-CSCF 28 may also forward SIP requests and responses to the S-CSCF 32. The I-CSCF 28 can also be used to "hide" the internal IMS network from the outside world. The HSS 30 may be a database that supports the IMS network entities (e.g., I-CSCF, S-CSCF) that actually handle calls. The HSS 30 may contain the subscription-related information or the subscriber profile, may perform subscriber authentication, and may provide information about the subscriber's location and IP information. The S-CSCF 32 may be a SIP server performing session control. The S-CSCF 32 may download user profiles or subscriber profiles from the HSS 30 to decide which IMS application server (not shown) should receive user's SIP messages to provide the multimedia services the user is authorized to receive. The S-CSCF 32 may also provide necessary routing services and enforce the policy of the network operator. It is understood that, contrary to the switching network 18, the IMS network 26 may be a packet-switched network (having packet-switched connections between various network elements therein).

The IMS network 26 may be coupled to another packet-switched network 34 (e.g., an Internet Protocol (IP) network such as the Internet) as well as a circuit-switched network (not shown) (such as the PSTN) to accomplish the desired connections beyond the carrier network 12. As shown in FIG. 1, the IMS network 26 may also be coupled to a Radio Access Network 16 to establish a connection to subscriber 14. Thus, as discussed below with reference to FIG. 2, a PSTN-originated call request may be re-routed to the subscriber terminal 14 via the IMS network 26.

When the subscriber 14 subscribes to mobile voice service, the operator of the wireless network 12 assigns the subscriber 14 (i.e., the subscriber's mobile handset or terminal) a Mobile Directory number (MDN) (which assists the network in routing calls to the subscriber terminal 14). The wireless network operator will then "home" (or register) the MDN on a network switch—here, the MSCe 20. This implies that all calls directed to the subscriber 14 and routed through the PSTN 25 to the subscriber's MDN will be routed to the subscriber's "home" MSCe (i.e., the MSCe 20) for service and further processing. It is noted here that the MDN may be an International Telecommunication Union Telecommunication Standardization Sector (ITU-T) E.164 number (having up to 15 digits) in accordance with the International Telecommunication Union's (ITU) international numbering plan for PSTNs in which each assigned number contains a country code (CC), a national destination code (NDC), and a subscriber number (SN). Once the MDN has been assigned to the MSCe 20 and the PSTN's network element router tables (not shown) are updated to route calls placed to the MDN to that MSCe 20, it may be difficult for a network operator to re-home the MDN to another network element within its network.

As new multimedia services are deployed, wireless network operators desire the freedom to route the call request from an MSCe into a multimedia network (e.g., an IMS network). If a subscriber subscribes to multimedia services and has not yet been assigned an MDN, then the wireless network operator will home the new MDN assigned to the subscriber to a network element within the multimedia network—i.e., the IMS network. However, if the subscriber has already been assigned an MDN (which is homed at an MSCe) and desires to add multimedia service to their subscription, the network operator will most probably leave the MDN homed on the MSCe. In this case, it is easier for the network operator to deploy a re-routing mechanism from the MSCe to the multimedia network (i.e., the IMS network) than to update the PSTN network element router tables.

Figure 2:
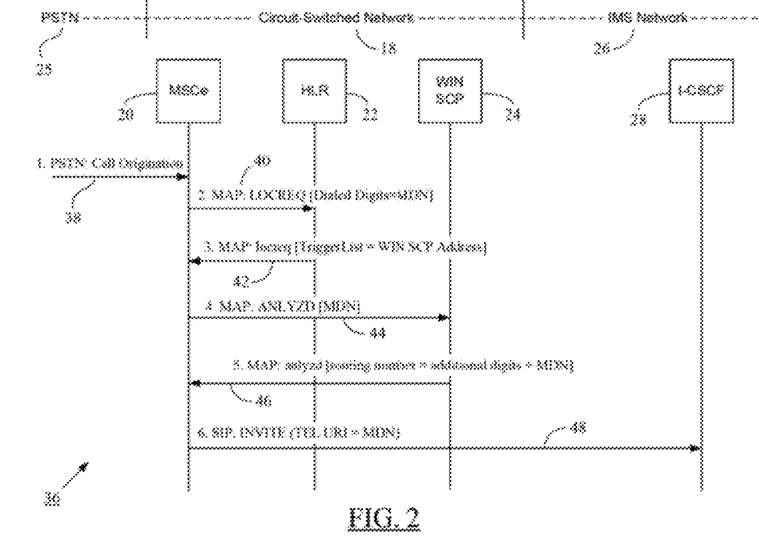
FIG. 2 (Prior Art) illustrates operations among various network elements in FIG. 1 to accomplish call delivery to an entry point (or entry element) for the IMS network.

FIG. 2 illustrates operations among various network elements in FIG. 1 to accomplish call delivery to an entry point (or entry element) for the IMS network 26—here, the I-CSCF 28. In FIG. 2, the originating operation is indicated by capital letters (e.g., LOCREQ), whereas its response operation is distinguished by using lower case letters (e.g., locreq) so as to maintain conciseness while depicting operations/messaging among various network elements without writing each operation by its full form. The operational sequence 36 in FIG. 2 may be as follows:

1) Initially, at step 38, the MSCe 20 receives a Call Origination from the PSTN 25. The Call Origination request may have originated from another wireline or wireless device (not shown), a service provider entity (e.g., a specific multimedia server), etc. The PSTN 25 routes the Call Origination request to the MSCe 20 with the MDN in the Called Party Number (CdPN) element of the Call Origination request because this MDN is homed at the MSCe 20.

2) At step 40, the MSCe 20 sends an American National Standards Institute-41 (ANSI-41) Mobile Application Part (MAP) Location Request (LOCREQ) INVOKE to the HLR 22 containing the CdPN (=MDN) received in step 38 in the Digits (Dialed) (alternatively referred to herein as "Dialed Digits") parameter of the MAP LOCREQ INVOKE.

3) At step 42, the HLR 22 responds with an ANSI-41 MAP LOCREQ RETURN RESULT (concisely indicated as MAP: locreq [ . . . ] in FIG. 2) to the MSCe 20. If the subscriber 14 has subscribed to IMS services, the LOCREQ RETURN RESULT instructs the MSCe 20 to perform an AnalyzedInformation (ANLYZD) WIN operation to the WIN SCP address provided in the LOCREQ RETURN RESULT operation.

4) At step 44, the MSCe 20 sends an ANSI-41 MAP ANLYZD INVOKE to the WIN SCP 24 containing the MDN received in step 38.

5) Based upon the received MDN value, the WIN SCP 24 constructs or maps the MDN to a routing number. The routing number may be combination of the MDN and a set of additional digits. It is noted here that different MDN values could be assigned different sets of additional digits. For example if MDN=800-555-xxxx, then the routing number could be 1234-800-555-xxxx, whereas if MDN=800-333-xxxx, then the routing number could be 6789-800-333-xxx. At step 46, the WIN SCP 24 responds with an ANSI-41 MAP ANLYZD RETURN RESULT (concisely indicated as MAP: anlyzd [ . . . ] in FIG. 2) to the MSCe 20 containing the routing number.

6) Through internal translations, the MSCe 20 uses the routing number (from the WIN SCP 24) to determine that the MSCe 20 is to send a SIP INVITE to an IP address of the next hop (e.g., the I-CSCF 28). At step 48, the MSCe 20 sends a SIP INVITE to the next hop or entry point (here, the I-CSCF 28) for the IMS network 26 with a Telephone Universal Resource Identifier (TEL URI) in the SIP INVITE set to the MDN.

It is noted here that in the case where the wireless network operator had assigned a new MDN to the subscriber for IMS services or had decided to take the onerous step of updating the network routing information (i.e., PSTN network element router tables), the Call Origination (from the PSTN) may have been routed by the PSTN directly to an IMS entry element (e.g., a Media Gateway Control Function (MGCF)) (not shown) instead of through the MSCe 20 as shown in FIG. 2. However, because of an operator's preference for MSCe-based re-routing—especially in case of an already-assigned MDNs, the network architecture for such direct communication to an IMS entry element is not shown in FIG. 1, nor is such communication shown in FIG. 2

SUMMARY

From the above discussion with reference to FIGS. 1 and 2, it is seen that the existing solution for re-routing a call request from an MSCe to an IMS network utilizes the HLR to identify if the subscriber has subscribed to the multimedia services (i.e., the IMS services). If the subscriber has subscribed to IMS services, the HLR instructs the MSCe to utilize WIN operations (by using a WIN SCP) for determining a routing number. The routing number returned by the WIN SCP is used by the MSCe to perform translations to route the call origination request towards the IMS network. This, of course, assumes that the translation tables of the MSCe have been somehow enhanced to support call routing towards the IMS network.

Furthermore, there are two main drawbacks to the existing solution based on WIN operations: (1) Because the IMS subscriber information is only stored at the HLR, the existing solution requires coordination of configuration information within different network elements—i.e., the HLR, the WIN SCP, and the MSCe translation table, and (2) the existing solution does not allow for effective traffic distribution to the IMS network. In the existing solution, although blocks of MDN values can be assigned different IP addresses from a particular set of IP addresses (e.g., IP addresses of different I-CSCFs in the IMS network), there is still no way to distribute the traffic as a function of call origination request volume (irrespective of the MDN values in the call origination request).

Therefore, it is desirable to devise a system and method for simplifying the existing call delivery re-routing mechanism described above. It is also desirable that the new mechanism not require WIN operations and configured MSCe translations for routing the call origination request to an IMS entry point (e.g., the I-CSCF).

The present invention provides a solution to the above-mentioned need to simplify existing call delivery re-routing mechanism to an IMS entry point for an MDN homed in a 2G wireless network. Particular embodiments of the present invention still rely on the HLR to identify if the subscriber has subscribed to the IMS services. However, the new mechanism according to various embodiments of the present invention improves upon the existing mechanism in that: (i) The HLR-based subscriber profile, for subscribers that have subscribed to IMS services, have been enhanced with new IMS-related subscriber information. (ii) The MSCe has been enhanced to receive/understand the new IMS-related subscriber information, when sent by the HLR. (iii) Certain American National Standards Institute-41 (ANSI-41) MAP operations have been enhanced and a new ANSI-41 parameter defined to inform the HLR that the MSCe is capable of receiving/understanding the new IMS-related subscriber information. (iv) The MSCe operations have been enhanced to route the call origination request (e.g., from the PSTN) based upon the new IMS-related subscriber information. (v) A Domain Name Server (DNS) can be used for traffic distribution (load balancing).

In one embodiment, the present invention is directed to a method of routing a call request from a Mobile Switching Center emulation (MSCe) in a wireless network to an Internet Protocol Multimedia Subsystem (IMS) network associated with the wireless network, wherein the call request relates to a subscriber in the wireless network having been assigned a Mobile Directory Number (MDN) that is homed on the MSCe. The method comprises the steps of: the MSCe receiving the call request; the MSCe communicating with a Home Location Register (HLR) in the wireless network to receive a response therefrom; and, upon receiving the response from the HLR, the MSCe routing the call request to an entry point for the IMS network without invoking a Wireless Intelligent Network (WIN) operation and associated routing number translation.

In another embodiment, the present invention is directed to a method comprising the steps of: receiving a call request at an MSCe in a wireless network, wherein the call request relates to a subscriber in the wireless network having been assigned an MDN that is homed on the MSCe; the MSCe communicating with an HLR in the wireless network to receive further subscriber-specific call processing information therefrom; and, without invoking a WIN operation, the MSCe performing one of the following operations based on the call processing information received from the HLR: (i) obtaining a first Internet Protocol (IP) address of a first entry point for an IMS network associated with the wireless network from an entity and routing the call request by sending a Session Initiation Protocol (SIP) INVITE to the first entry point identified by the first IP address, or (ii) without contacting the entity, routing the call request by sending the SIP INVITE to a second IP address of a second entry point for the IMS network.

In a method involving American National Standards Institute-41 (ANSI-41) MAP-based signaling between a network switch and an HLR in a wireless network wherein the network switch uses an ANSI-41 MAP LocationRequest (LOCREQ) INVOKE operation to obtain call treatment information from the HLR for a call request received by the network switch for a subscriber in the wireless network, the present invention is directed to an improvement in one embodiment thereof. The improvement comprises: enhancing a TransactionCapability parameter in the MAP LOCREQ INVOKE operation to allow the network switch to indicate to the HLR that the network switch is capable of supporting an enhanced TerminationList parameter in a MAP LOCREQ RETURN RESULT operation by the HLR, wherein the call treatment information in the enhanced TerminationList parameter allow the network switch to route the call request to an entry point for an IMS network without performing a WIN operation.

In a method involving ANSI-41 MAP-based signaling between a network switch and an HLR in a wireless network wherein the network switch uses an ANSI-41 MAP LOCREQ INVOKE operation to obtain call treatment information from the HLR for a call request received by the network switch for a subscriber in the wireless network and wherein the HLR uses an ANSI-41 MAP LOCREQ RETURN RESULT operation to provide the call treatment information, the present invention is directed to an improvement in one embodiment thereof. The improvement comprises: enhancing a TerminationList parameter in the MAP LOCREQ RETURN RESULT with information that allows the network switch to route the call request to an entry point for an IMS network without performing a WIN operation.

In another embodiment, the present invention is directed to a Mobile Switching Center emulation (MSCe) for routing a call request for a subscriber in a wireless network to an IMS network associated with the wireless network. The MSCe is configured to perform the following: receive the call request; communicate with an HLR in the wireless network to receive further subscriber-specific call-processing information therefrom; and, in response to the call-processing information from the HLR, route the call request to an entry point for the IMS network without invoking a WIN operation and associated routing number translation.

In another embodiment, the present invention is directed to an HLR to provide call-processing information to an MSCe in a wireless network to enable the MSCe to route a call request for a subscriber in the wireless network to an IMS network associated with the wireless network. The HLR is configured to perform the following: receive an ANSI-41 MAP LOCREQ INVOKE from the MSCe, wherein the MAP LOCREQ INVOKE contains an enhanced TransactionCapability parameter indicating that the MSCe is capable of supporting an enhanced TerminationList parameter in the call-processing information from the HLR; determine whether the subscriber has subscribed to IMS services; and, if the subscriber has subscribed to IMS services, send the call-processing information to the MSCe via an ANSI-41 MAP LOCREQ RETURN RESULT, wherein the MAP LOCREQ RETURN RESULT contains the enhanced TerminationList parameter with information that allows the MSCe to route the call request to an entry point for the IMS network without performing a WIN operation.

In a further embodiment, the present invention is directed to a system that comprises: an HLR containing subscription-related information for a subscriber in a wireless network; and an MSCe in communication with the HLR to receive call-processing information therefrom when routing a call request for the subscriber. The MSCe is configured to perform the following upon receiving the call request for the subscriber: communicate with the HLR to receive the call-processing information therefrom, and, in response to the call-processing information from the HLR, route the call request to an entry point for an IMS network without invoking a WIN operation and associated routing number translation.

The teachings of the present invention thus provide a more effective mechanism for traffic distribution to the IMS entry points and for a faster call setup when routing from the MSCe to an IMS network is required. The call delivery without invoking WIN operations reduces configuration information and the co-ordination of configuration information within different network elements.

BRIEF DESCRIPTION OF THE DRAWINGS

In the following section, the invention will be described with reference to exemplary embodiments illustrated in the figures, in which.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention. Additionally, it should be understood that although the invention is described primarily in the context of a 2G cellular telephone/data network, the teachings of this invention—related to call delivery through enhanced network elements and ANSI-41 MAP operations (as discussed below)—can be implemented in other forms of cellular or non-cellular wireless networks as well (for example, a corporate-wide wireless data network, a point-to-point wireless communication network such as a wireless walkie-talkie network, a satellite communication system, and the like).

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "co-ordination") may be occasionally interchangeably used with its non-hyphenated version (e.g., "coordination"), a capitalized entry (e.g., "Call Origination") may be interchangeably used with its non-capitalized version (e.g., "call origination"), and plural terms may be indicated with or without an apostrophe (e.g., I-CSCF's or I-CSCFs). Such occasional interchangeable uses shall not be considered inconsistent with each other.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing voice information or non-voice data/control information) to the second entity regardless of the type (analog or digital) of those signals. It is further noted that various figures (including network diagrams, component diagrams, or messaging sequences) shown and discussed herein are for illustrative purpose only, and are not drawn to scale.

Figure 3:
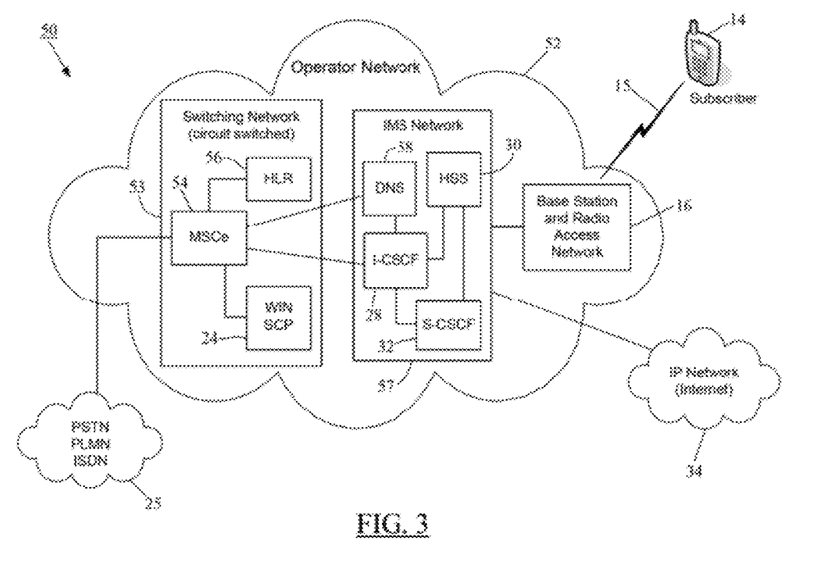
FIG. 3 depicts an exemplary wireless network architecture to implement call delivery to an IMS network according to the teachings of the present invention.

FIG. 3 depicts an exemplary wireless network architecture 50 to implement call delivery to an IMS network 57 according to the teachings of the present invention. In FIGS. 1 and 3, network elements having the same or substantially similar functionality are identified by the same reference numerals for ease of discussion. As in case of the network architecture 10 in FIG. 1, the network architecture 50 in FIG. 3 includes a wireless operator network 52 supporting call routing for calls routed through the PSTN (or PLMN, ISDN, other wireline network) 25 to the subscriber 14. The base station and RAN 16 in the operator network 52 may provide access to the subscriber 14 through the radio interface 15 to the subscriber's mobile terminal 14. In one embodiment, the base station and RAN 16 may include a site controller, a pico or femto node, an access point (AP), or any other type of radio interface device capable of operating in a wireless environment. It is noted here that the terms "mobile handset," "user equipment (UE)," "subscriber terminal," "mobile station (MS)," and other terms having similar import may be used interchangeably herein to refer to a wireless communication device that is capable of voice and/or data communication via a wireless carrier network. Some examples of such mobile handsets include cellular telephones or data transfer equipments (e.g., a Personal Digital Assistant (PDA) or a pager), smartphones (e.g., iPhone™, Android™, Blackberry™, etc.), computers, or any other type of user devices capable of operating in a wireless environment. Similarly, the terms like "wireless network," "operator network," or "carrier network" may be used interchangeably herein to refer to a wireless communication network (e.g., a cellular network) facilitating voice and/or data communication between two mobile handsets.

The operator network 52 may include a circuit-switched switching network 53 containing an enhanced MSCe 54, an enhanced HLR 56, and the WIN SCP 24. These network elements 54, 56 represent enhanced versions of corresponding elements 20, 22 in FIG. 1. The enhancements to these network elements 54, 56 are discussed below. Like the MSCe 20 in FIG. 1, the MSCe 54 may be connected to a wireline network 25, which may be a PSTN, a PLMN, an ISDN, or a combination of one or more of these and other such networks. For ease of discussion, the term "PSTN" is conveniently used herein as representative of such wireline network 25. As in case of the MSCe 20 in FIG. 1, because of the focus of the present discussion on the routing aspects in the network 52, the reference numeral "54" is used to refer to the MSCe 54 as the "network switch" in the operator network 52 for the sake of simplicity and ease of discussion. It is however observed that, in certain other embodiments, the reference numeral "54" may represent a network switch such as an MSC that incorporates the MSCe functionality. Furthermore, although the WIN SCP 24 is shown as part of the switching network 53, it is noted here that the present invention does not use WIN-based operations and, hence, does not need WIN SCP 24 to implement the call delivery mechanism discussed below. However, in situations where enhanced call delivery approach according to the teachings of the present invention is not possible, the MSCe 54 may perform call delivery using WIN SCP 24 in the manner discussed before with reference to FIG. 2.

When the subscriber 14 subscribes to mobile voice service, the operator of the wireless network 52 assigns the subscriber 14 (i.e., the subscriber's mobile handset or terminal) a Mobile Directory number (MDN) (which assists the network in routing calls to the subscriber terminal 14). The wireless network operator will then "home" (or register) the MDN on a network switch—here, the MSCe 54. This implies that all calls directed to the subscriber 14 and routed through the PSTN 25 to the subscriber's MDN will be routed to the subscriber's "home" MSCe (i.e., the MSCe 54) for service and further processing. It is noted here that the MDN may be an E.164 number as mentioned earlier. Once the MDN has been assigned to the MSCe 54, the PSTN's network element router tables (not shown) may be updated to route calls placed to the MDN to that MSCe 54. Like HLR 22, the HLR 56 may also contain a database (not shown) storing subscriber-specific information such as, for example, the subscriber's MEID or IMEI number, the MDN, the address of the subscriber's "home" or "registered" location, the class of services (e.g., IMS services) subscribed by the subscriber, etc.

As is understood, the switching network 53 may include additional elements such as, for example, an MGW, a Visitor Location Register (VLR), an Authentication Center (AU or AUC), an Equipment Identity Register (EIR), etc. However, such additional elements are not shown in FIG. 3 nor discussed herein for the sake of brevity. In one embodiment, enhancements to MSCe 54 and HLR 56 may be provided in hardware, via software, or both. For example, when existing hardware architecture of a network element cannot be modified, then the enhancements (discussed below) may be accomplished through suitable programming of one or more processors (e.g., processor 87 in FIG. 7 or processor 92 in FIG. 8, as applicable) in the respective network element. The execution of the program code (by a processor in the network element) may cause the processor to implement the network element-specific enhanced feature(s) discussed herein. Thus, in the discussion below, although the MSCe 54, the HLR 56, or any other network element (e.g., the I-CSCF 28) may be referred to as "performing," "accomplishing," or "carrying out" a function or process, it is evident to one skilled in the art that such performance may be technically accomplished in hardware and/or software as desired.

The carrier network 52 may include additional network elements (not shown) that provide logical and control functions (e.g., subscriber account management, billing, subscriber mobility management, etc.) in the network 52. Other packet-switched network elements (e.g., a Serving General Packet Radio Service Support Node (Serving GPRS Support Node or SGSN), a Gateway GPRS Support Node (GGSN), etc.) (not shown) may also be present in the network 52. As mentioned earlier with reference to FIG. 1, a packet-switched IMS network 57 may be a part of the operator's network 52 (as shown in FIG. 3) or may be a separate network associated with the network 52 (through wireline and/or wireless means) to provide multimedia services to subscribers/clients of the operator. Similar to the IMS network 26 in FIG. 1, the IMS network 57 in FIG. 3 may also include the I-CSCF 28 as an "entry point" (or "entry element") for the network 57, the HSS 30, and the S-CSCF 32. In addition, for ease of discussion, the IMS network 57 is shown to also include a Domain Name Server (DNS) 58 for translation of domain names into IP addresses and traffic distribution (or load balancing) as discussed in more detail below with reference to FIGS. 4 and 5. However, in other embodiments, the DNS may also be associated with any other part of the operator's network 52, or may be part of a separate network associated with network 52. Although not shown in FIG. 3 for the sake of brevity and ease of discussion, it is noted that the IMS network 57 may include additional elements as well—such as, for example, an Application Server (AS) or Application Function (AF), a Proxy-CSCF (P-CSCF), etc. It is noted here that a "function" (e.g., as an AF, a CSCF, etc.) in the IMS network 57 may not be a strict hardware box or node in certain embodiments. For example, an implementer may combine two functions in a single node, or split a single function into two or more nodes, or implement a function entirely via software. Also, each node can be present multiple times in a single IMS network 57, for dimensioning, load balancing, or organizational issues. The IMS network 57 may also be connected to other networks such as the packet-switched IP network (or the Internet) 34, a circuit-switched network (e.g., the PSTN 25) (connection not shown in FIG. 3), etc., to accomplish desired connections for the subscriber terminal 14 beyond the carrier network 52 and also to provide the subscriber 14 with an access to external multimedia resources and content. Thus, through the base station's 16 connection to the IMS network 57, and the mobile handset's 14 radio link with the base station 16, a user of the handset 14 may wirelessly (and seamlessly) access many different resources or systems beyond those operating within the carrier network 52.

As is understood, the wireless network 52 may be a cellular telephone network in which the MS 14 may be a subscriber unit. However, as mentioned before, the present invention is operable in other non-cellular wireless networks as well (whether voice networks, data networks, or both). Furthermore, portions of the wireless network 53 may include, independently or in combination, any of the present or future wireline or wireless communication networks such as, for example, the PSTN, or a satellite-based communication link. Similarly, as also mentioned above, the wireless network 52 may be connected to the Internet via its IMS network's 57 connection to the IP (packet-switched) network 34 or may include a portion of the Internet as part thereof. Also, like the wireless network 12, the wireless network 52 may be a network such as a TDMA-based network, a CDMA network, a cdma2000® network, etc.

The teachings of the present invention refer to various ANSI-41 parameters and ANSI-41 MAP operations described more fully in the following two Third Generation Partnership Project 2 (3GPP2) documents: (1) 3GPP2 X.S0004-540-E v3.0, Mobile Application Part (MAP)—Operations Signaling Protocols, August 2007 (referred to herein as "Ref-1" for the sake of convenience), and (2) 3GPP2 X.S0004-550-E v4.0, Mobile Application Part (MAP)—Parameters Signaling Protocols, January 2010 (referred to herein as "Ref-2" for the sake of convenience). The portions of these two documents relevant to the discussion of the operations and parameters in the present invention are incorporated herein by reference in their entireties.

Figure 4:
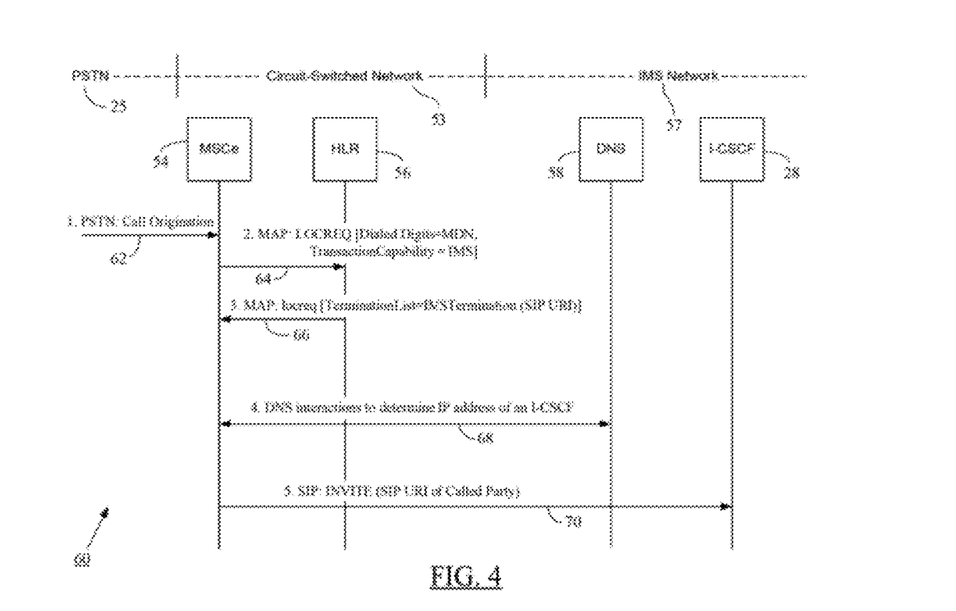
FIG. 4 illustrates operations among various network elements in FIG. 3 to accomplish re-routing of a call request to an IMS network according to one embodiment of the present invention.
Figure 5:
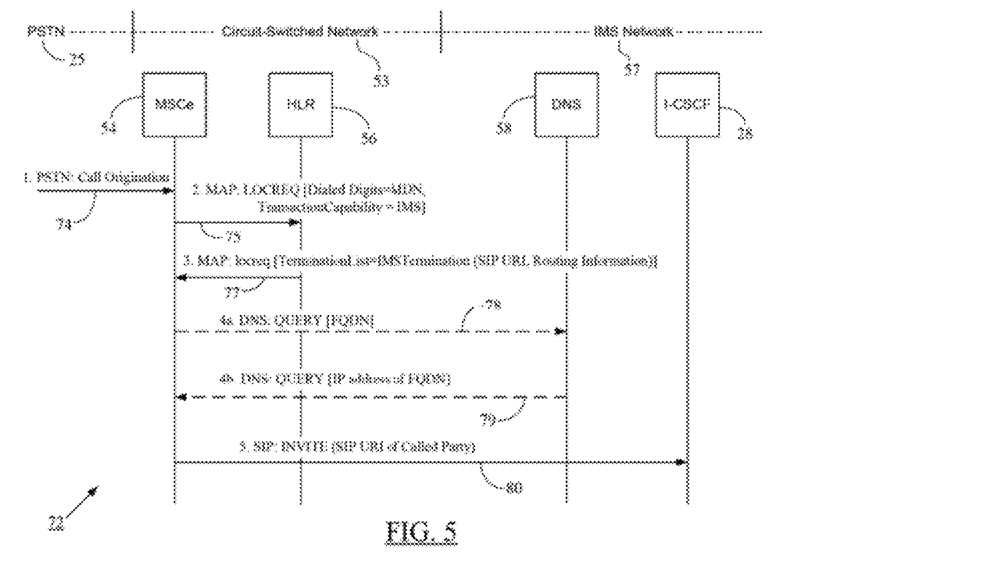
FIG. 5 shows operations among various network elements in FIG. 3 to accomplish re-routing of a call request to an IMS network.

The present invention provides two variants of a new re-routing mechanism for simplifying the existing re-routing mechanism described with reference to FIG. 2. The operational sequences for these two variants are shown in FIGS. 4 and 5, respectively, and discussed in more detail below. The new mechanism still relies on the HLR to identify if the subscriber has subscribed to IMS services. The present invention makes the following enhancements to the existing mechanisms (which are discussed in further detail with reference to FIGS. 4 and 5 below):

(1) In one embodiment, the ANSI-41 "TransactionCapability" parameter (described in more detail in Ref-2) may be enhanced (e.g., by the operator) by adding a new field thereto. The new field may be referred to as an "IMS" field. In one embodiment, the IMS field may contain a binary value. In other embodiments, the IMS field may contain non-binary digits, symbols, alpha-numeric character, etc. In one embodiment, if the IMS field is set to the value of "1," then it indicates that the system (i.e., the MSCe 54) is capable of supporting an enhanced "TerminationList" type that contains an "IMSTermination" parameter in the LOCREQ RETURN RESULT (described in more detail in Ref-2). The MSCe 54 may be configured (e.g., through programming thereof) to set the IMS field itself, or the IMS field may be set by the operator as part of the configuration of the network 52.

(2) In another embodiment, the ANSI-41 LOCREQ INVOKE (described in more detail in Ref-1) may be enhanced (e.g., by the operator) to allow the HLR 56 to receive a TransactionCapability parameter (from the MSCe 54) containing an indication—i.e., the IMS field—of MSCe's IMS capability.

(3) In one embodiment, the ANSI-41 "Profile" (described in more detail in Ref-2) may be enhanced (e.g., by the operator) with a new optional parameter called "IMSInformation." The "Profile" may be stored in the HLR 56. If the subscriber 14 has subscribed to IMS services, the ANSI-41 Profile for the subscriber may be enhanced to include the IMSInformation parameter. The IMSInformation parameter, at a minimum, may include the Session Initiation Protocol Uniform Resource Identifier (SIP URI) of the subscriber 14 (i.e., the SIP URI of the subscriber's mobile terminal). The SIP URI may contain a host domain name associated with an entry point for the IMS network 57 and may also be associated with the subscriber's MDN. The IMSInformation parameter may also include an optional parameter—referred to herein as a "RoutingInformation" parameter—based upon operator configuration. The RoutingInformation parameter may be configured (e.g., by the HLR 56 itself if it is configured (e.g., through proper programming thereof) to do so or by the operator of the network 52 as part of the configuration of the network 52) depending on how the wireless network operator wants MSCe 54 to process call requests for subscriber 14. For example, in one embodiment, if the operator wants all call requests from PSTN 25 to subscriber 14 to always be sent to a particular IMS entry point (e.g., I-CSCF 28) then the RoutingInformation parameter may be (i) any or a combination of: an IP address, a Port Number, and a transport protocol (e.g., Transmission Control Protocol (TCP) or User Datagram Protocol (UDP)) of I-CSCF 28, or (ii) any or a combination of: a Fully Qualified Domain Name (FQDN), a Port Number, and a transport protocol for I-CSCF 28 (e.g., FQDN="icscf45.ims.operator4", Port Number="5060", Transport Protocol="UDP"). Thus, the IMSInformation parameter may include the SIP URI (of the subscriber) alone or with the RoutingInformation parameter, depending on the configuration.

(4) In a further embodiment, a new ANSI-41 parameter—referred to herein as an "IMSTermination" parameter—may be defined (e.g., by the operator) to contain at least two fields (each of which could be of variable length). One of those two fields may contain the SIP URI of the subscriber and the other field may contain the RoutingInformation parameter.

(5) In one embodiment, the ANSI-41 "TerminationList" parameter (described in more detail in Ref-2) may be enhanced (e.g., by the operator) to allow for an optional parameter called "IMSTermination" (mentioned above).

(6) In one embodiment, the LOCREQ RETURN RESULT operation by the HLR 56 (as compared to HLR 22) may be enhanced in the following manner:

(a) The HLR 56 may initially determine if the subscriber 14 has subscribed to IMS services. If the subscriber 14 has indeed subscribed to IMS services and if the new TransactionCapability parameter is received (from the MSCe 54 sending a LOCREQ INVOKE to HLR 56) with the IMS field set to "1", then, in one embodiment, the HLR 56 may be configured (in hardware and/or software) to send the IMSTermination parameter in the TerminationList parameter of the LOCREQ RETURN RESULT to the MSCe 54.

(b) The HLR 56 may be configured to create the IMSTermination parameter by using the IMSInformation parameter in the subscriber's ANSI-41 "Profile" stored therein or supplied thereto. Depending upon operator configuration, as mentioned earlier, the IMSTermination parameter may contain the SIP URI of the subscriber with or without the RoutingInformation parameter.

(7) The MSCe 54 may support the following operations depending on whether the RoutingInformation parameter is sent as part of a LOCREQ RETURN RESULT from the HLR 56:

(a) If the MSCe 54 receives an IMSTermination parameter in the LOCREQ RETURN RESULT from the HLR 56: (i) Contrary to the existing solution in FIG. 2 involving MSCe 20, the enhanced MSCe 54 may be configured (e.g., by modifying its call control logic) to not invoke routing number translations. (ii) If the IMSTermination parameter contains only the SIP URI of the subscriber 14 (i.e., without the RoutingInformation parameter), then the MSCe 54 may send a DNS query to the DNS 58 to determine the IP address of the IMS entry point (e.g., the IP address of the I-CSCF 28) for the host domain name identified in the SIP URI of the subscriber. (iii) The MSCe 54 may send a SIP INVITE to the IP address returned from the DNS Query.

(b) If the MSCe 54 receives an IMSTermination parameter in the LOCREQ RETURN RESULT from the HLR 56: (i) Contrary to the existing solution in FIG. 2 involving MSCe 20, the enhanced MSCe 54 may be configured (e.g., by modifying its call control logic) to not invoke routing number translations. (ii) If the IMSTermination parameter contains the SIP URI of the subscriber 14 along with the RoutingInformation parameter that is an FQDN, then the MSCe 54 may send a DNS Query to the DNS 58 to resolve the IP address of the FQDN. (iii) The MSCe 54 may send a SIP INVITE to the IP address provided by the RoutingInformation parameter (when the RoutingInformation parameter is an IP address and not an FQDN) or to the IP address received from the DNS Query (i.e., when the RoutingInformation parameter is an FQDN).

FIG. 4 illustrates operations among various network elements in FIG. 3 to accomplish re-routing of a call request to an IMS network (e.g., the IMS network 57) according to one embodiment of the present invention. The operational sequence 60 illustrated in FIG. 4 may occur when the MSCe 54 receives an IMSTermination parameter, in the LOCREQ RETURN RESULT (from the HLR 56), that only contains the SIP URI of the subscriber (i.e., the IMSTermination parameter is without the RoutingInformation parameter). In FIG. 4 (and also in FIG. 5), the originating operation is indicated by capital letters (e.g., LOCREQ), whereas its response operation is distinguished by using lower case letters (e.g., locreq) so as to maintain conciseness while depicting operations/messaging among various network elements without writing each operation by its full form. The operational sequence 60 may be as follows:

1) Initially, at step 62 (like step 38 in FIG. 2), the MSCe 54 may receive a Call Origination from the PSTN 25. As mentioned earlier with reference to discussion of FIG. 2, the Call Origination request (e.g., an Integrated Services Digital Network User Part (ISUP) Initial Address message (IAM)) may be from another wireline or wireless device (not shown), a service provider entity (e.g., a specific multimedia server), etc. The PSTN 25 routes the Call Origination request to the MSCe 54 with the MDN in the Called Party Number (CdPN) element of the Call Origination request because this MDN is homed at the MSCe 54.

2) At step 64, the MSCe 54 sends an ANSI-41 MAP LOCREQ INVOKE to the HLR 56 containing the CdPN (=MDN) received in step 62 in the Dialed Digits parameter of the MAP LOCREQ INVOKE. The MSCe 54 is configured to support the enhanced TransactionCapability value—i.e., the "IMS" field—the MSCe 54 may set "IMS=1" in the TransactionCapability parameter of the MAP LOCREQ INVOKE. The new TransactionCapability value (with the "IMS" field value="1") indicates (to the HLR 56) that the MSCe 54 is capable of accepting an IMSTermination parameter in the TerminationList parameter of the LOCREQ RETURN RESULT (from the HLR 56).

3) The ANSI-41 subscriber "Profile" associated with the received MDN value (of the subscriber 14) and stored in the HLR 56 may contain an IMSInformation parameter. The HLR 56 may construct an IMSTermination parameter using the IMSInformation parameter from the ANSI-41 subscriber Profile. Then, at step 66, the HLR 56 may respond with an ANSI-41 MAP LOCREQ RETURN RESULT to the MSCe 54. The HLR 56 may return an IMSTermination in the TerminationList parameter of the LOCREQ RETURN RESULT (e.g., when the HLR 56 determines that the subscriber 14 has subscribed to IMS services). In this embodiment, the IMSTermination contains only the SIP URI of the subscriber (e.g., PartyB@operator4.com).

4) At step 68, the MSCe 54 communicates with DNS 58 to determine an IP address of an I-CSCF that is associated with the domain name of the SIP URI. In one embodiment, this interaction may usually involve three DNS Queries and responses between the MSCe 54 and the DNS 58. The first DNS Query may try to find the transport protocols supported by SIP Services for the host domain name (e.g., operator4.com). The host domain name may be a part of the SIP URI of the subscriber 14 received from the HLR 56. For example, the DNS 58 may return "_sip.tcp.operator4.com" and "_sip.udp.operator4.com" in response to the first DNS Query. Based upon the results of the first DNS Query, the MSCe 54 may make a second DNS Query requesting information about SIP services for the transport protocol (e.g., TCP or UDP) that the MSCe 54 wants to use for communications with the I-CSCF. The second DNS Query may return the host names and port numbers of one or more I-CSCFs supporting the IMS network associated with the host domain name. For example, the DNS 58 may return "icscf1.operator4.com" and "iscsf2.operator4.com" with port number 5060 for both I-CSCFs. If configured, the DNS 58 may perform load balancing as well by instructing the MSCe 58 which I-CSCF in the second DNS Query response is the preferred I-CSCF for the MSCe 54 to use. Having determined the preferred transport protocol host name (e.g., "icscf1.operator4.com") and the port number (e.g., 5060) the MSCe 54 may perform a third DNS Query to find the IP address of the desired I-CSCF (e.g., icscf1.operator4.com").

5) At step 70, the MSCe 54 may construct a SIP INVITE message using the information received in the Call Origination request (step 62) and using the SIP URI of the subscriber (received from the HLR 56 at step 66) and send the SIP INVITE to the IP address received at step 68 (which, in the embodiment of FIG. 4, may be the IP address of the I-CSCF 28).

Thus, it is seen from FIG. 4 that the MSCe 54 does not need to perform any WIN operation (involving WIN SCP as in case of the existing solution discussed with reference to FIG. 2) and associated routing number translation to route the call request (addressed to the subscriber 14) to the IMS network 57.

Another embodiment of the present invention is shown in FIG. 5, which shows operations among various network elements in FIG. 3 to accomplish re-routing of a call request to an IMS network (e.g., the IMS network 57). The operational sequence 72 illustrated in FIG. 5 may occur when the MSCe 54 receives an IMSTermination parameter, in the LOCREQ RETURN RESULT (from the HLR 56), that contains the SIP URI of the subscriber along with the RoutingInformation parameter. As mentioned earlier, the RoutingInformation parameter could be either one or more of an IP address, Port Number and Transport Protocol or one or more of an FQDN, Port Number and Transport Protocol for sending SIP messaging associated with an MDN to a predetermined IMS network entry point (e.g., the I-CSCF 28). The operational sequence 72 may be as follows:

1) Initially, at step 74 (like step 62 in FIG. 4), the MSCe 54 may receive a Call Origination from the PSTN 25. As mentioned earlier with reference to discussion of FIG. 2, the Call Origination request (e.g., an ISUP IAM) may be from another wireline or wireless device (not shown), a service provider entity (e.g., a specific multimedia server), etc. The PSTN 25 routes the Call Origination request to the MSCe 54 with the MDN in the CdPN element of the Call Origination request because this MDN is homed at the MSCe 54.

2) At step 75 (like step 64 in FIG. 4), the MSCe 54 sends an ANSI-41 MAP LOCREQ INVOKE to the HLR 56 containing the CdPN (=MDN) received in step 74 in the Dialed Digits parameter of the MAP LOCREQ INVOKE. Because the MSCe 54 is configured to support the enhanced TransactionCapability value—i.e., the "IMS" field—the MSCe 54 may set "IMS=1" in the TransactionCapability parameter of the MAP LOCREQ INVOKE. The new TransactionCapability value (i.e., the "IMS" field value="1") indicates (to the HLR 56) that the MSCe 54 is capable of accepting an IMSTermination parameter in the TerminationList parameter of the LOCREQ RETURN RESULT (from the HLR 56).

3) The ANSI-41 subscriber "Profile" associated with the received MDN value (of the subscriber 14) and stored in the HLR 56 may contain an IMSInformation parameter. The HLR 56 may construct an IMSTermination parameter using the IMSInformation parameter from the ANSI-41 subscriber Profile. Then, at step 77, the HLR 56 may respond with a MAP LOCREQ RETURN RESULT to the MSCe 54. The HLR 56 may return an IMSTermination in the Termination-List parameter of the LOCREQ RETURN RESULT (e.g., when the HLR 56 determines that the subscriber 14 has subscribed to IMS services). Here, the IMSTermination contains the SIP URI of the subscriber (e.g., PartyB@operator4.com) along with a RoutingInformation parameter.

4a) If the RoutingInformation parameter contained an FQDN, then, at step 78, the MSCe 54 may send a DNS Query containing the FQDN to the DNS 58. As mentioned earlier, the FQDN may be associated with a particular IMS entry point (e.g., "icscf1.operator4.com") that the operator (of the wireless network 52) has selected for sending SIP messaging associated with the MDN (received in step 74) to.

4b) The DNS 58 may translate the FQDN to an IP address and, at step 79, send its response to the MSCe 54 with the IP address.

It is observed here that steps 78 and 79 in FIG. 5 are shown by dotted lines because they occur only when the RoutingInformation parameter contains an FQDN. If the RoutingInformation parameter is already an IP address (i.e., not an FQDN), then there may be no need for the MSCe 54 to contact the DNS server 58 for any IP address. In that event, the MSCe 54 may simply perform the step 80 (described below) without steps 78 and 79.

5) At step 80, the MSCe 54 may construct a SIP INVITE message using the information received in the Call Origination request (step 74) and the SIP URI of the subscriber (received from the HLR 56 at step 77) and sends the SIP INVITE either to the IP address given in the RoutingInformation parameter (at step 77) (i.e., when the RoutingInformation parameter does not contain an FQDN) or to the IP address returned from the DNS Query at step 79 (i.e., when the RoutingInformation parameter contains an FQDN), whichever is applicable. In the embodiment of FIG. 5, the SIP INVITE is shown to be sent to the IP address of the I-CSCF 28.

It is observed here that if the LOCREQ RETURN RESULT from the HLR 56 at step 77 does not contain the RoutingInformation parameter or contains the RoutingInformation parameter that is empty (or without content), then the MSCe 54 may not perform the operations at steps 78 through 80, but, instead, may perform the operations similar to those shown at steps 68 through 70 in FIG. 4—i.e., using just the content of SIP URI received at step 77.

Figure 6:
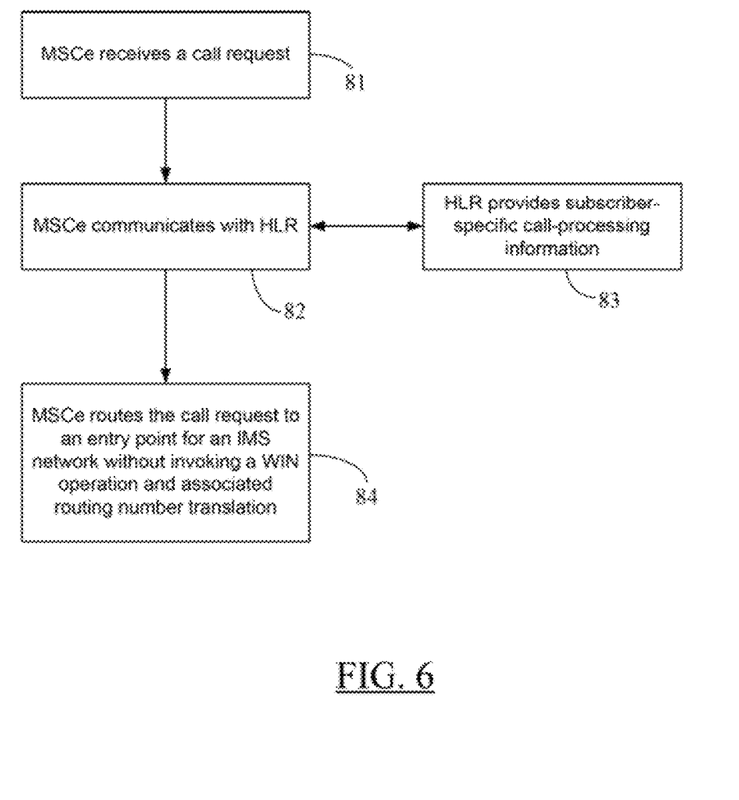
FIG. 6 is an exemplary flowchart depicting re-routing of a call request according to one embodiment of the present invention.

FIG. 6 is an exemplary flowchart depicting re-routing of a call request according to one embodiment of the present invention. The discussion of various blocks illustrated in FIG. 6 is already provided in detail hereinbefore with reference to discussion of FIGS. 4-5. Therefore, FIG. 6 is only briefly described here. As shown in FIG. 6, upon receiving a call request (e.g., from the PSTN 25) at block 81, the MSCe 54 may communicate with the HLR 56 to receive subscriber-specific call processing information from the HLR 56 (blocks 82, 83 in FIG. 6). As discussed earlier with reference to FIGS. 4-5, the call-processing information from the HLR 56 may include the IMSTermination parameter with information that allows the MSCe 54 to route the call request to an entry point (e.g., the I-CSCF 28) for the IMS network 57 without performing a WIN operation and associated routing number translation (block 84 in FIG. 6).

Figure 7:
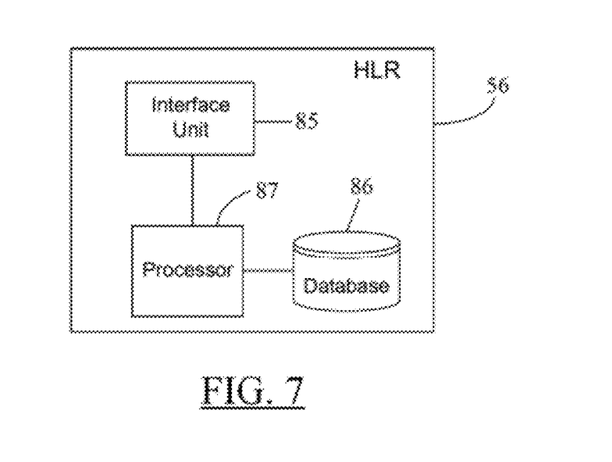
FIG. 7 is a block diagram of an exemplary HLR according to one embodiment of the present invention.

FIG. 7 is a block diagram of an exemplary HLR 56 according to one embodiment of the present invention. In one embodiment, the HLR 56 may be a server computer (e.g., a UNIX workstation). In other embodiments, functionality of the HLR 56 may be implemented through other computing devices as well. The HLR 56 may include an interface unit 85, a processor 87, and a memory or database 86. The processor 87 may be coupled to the interface unit 85 and the database 86 as shown. The interface unit 85 may provide communication interface with a network switch (e.g., an MSC or the MSCe 54), a VLR (not shown), etc. The database 86 may function like an "electronic directory" storing subscriber's 14 wireless subscription-related and other information (e.g., subscriber's mobile handset's IMEI number, subscriber's MDN, the list of multimedia services subscribed by the subscriber, etc.) to enable the network switch 54 to carry out proper routing and processing of subscriber-specific call requests and to enable other network entities (e.g., a VLR, etc.) (not shown) to manage the subscriber account. In particular embodiments, some or all of the functionalities described above (e.g., determination of a subscriber's IMS subscription status, construction of the IMSTermination parameter using the information in the subscriber's ANSI-41 profile, transmission of call-processing instructions/information to the MSCe 54 via LOCREQ RETURN RESULT operation, etc.) as being provided by the enhanced HLR 56 may be provided by the processor 87 executing instructions stored on a computer-readable medium, such as the memory/database 86 shown in FIG. 7. Alternative embodiments of the HLR 56 may include additional components beyond those shown in FIG. 7 that may be responsible for providing certain aspects of the HLR's functionality, including any of the functionality described above and/or any functionality necessary to support the solution described above (e.g., the operations shown in FIGS. 4 and 5).

Figure 8:
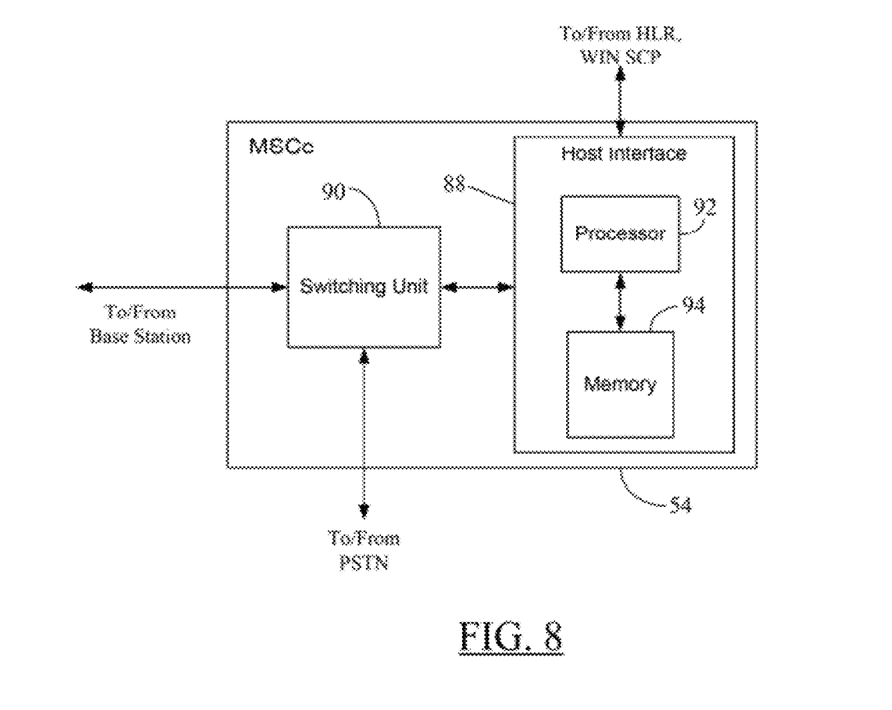
FIG. 8 is a block diagram of an exemplary network switch according to one embodiment of the present invention.

FIG. 8 is a block diagram of an exemplary network switch (e.g., the MSCe 54 or a similar functional entity) according to one embodiment of the present invention. The network switch 54 may include a host interface 88 and a switching unit 90. The host interface 88 may provide communication interface with the HLR 56, the WIN SCP 24, and other network elements (not shown) in the switching network 53. The switching unit 90 may be coupled to the host interface 88 as shown. The switching unit 90 may receive call requests from a base station (not shown) or the PSTN 25 and may provide appropriate call switching or routing support based on processing instructions received from the host interface 88. The host interface 88 may include a processor 92 coupled to a memory 94 to process routing requests from a base station or PSTN 25 based on data and other call-processing information received from the HLR 56. In the event that WIN-based operations are needed (e.g., when the methodology according to the present invention is not implemented or is not applicable to a specific subscriber), the processor 92 may provide routing according to the existing methodology depicted in FIG. 2. The processor 92 may be configured (in hardware and/or software) to perform call control functions of an MSCe. In particular embodiments, some or all of the functionalities described above (e.g., MSCe not invoking WIN operations and associated routing number translations when the IMSTermination parameter is received from the HLR 56, transmission of DNS queries, setting a value of the IMS field, constructing the SIP INVITE, and sending enhanced TransactionCapability parameter using LOCREQ INVOKE operation, etc.) as being provided by the enhanced network switch or MSCe 54 may be provided by the processor 92 executing instructions stored on a computer-readable medium, such as the memory 94 shown in FIG. 8. Alternative embodiments of the MSCe 54 may include additional components beyond those shown in FIG. 8 that may be responsible for providing certain aspects of the MSCe's functionality, including any of the functionality described above and/or any functionality necessary to support the solution described above (e.g., the operations shown in FIGS. 4 and 5).

It is noted here that many of the operations discussed with reference to FIGS. 4 and 5 may be implemented through a computer program, software, or firmware incorporated in a computer-readable storage medium (e.g., the memory 86 in FIG. 7 and memory 94 in FIG. 8) for execution by a general purpose computer or a processor (e.g., the processor 87 in FIG. 7 and processor 92 in FIG. 8). The processors 87 and 92 may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Similarly, examples of computer-readable storage media (e.g., the memory 86 and the memory 94) include a Read Only Memory (ROM), a Random Access Memory (RAM), a digital register, a cache memory, semiconductor memory devices or structures, magnetic media such as internal hard disks, magnetic tapes and removable disks, magneto-optical media, and optical media such as CD-ROM disks and Digital Versatile Disks (DVDs).

The foregoing describes a system and method to provide call delivery to an IMS network for an MDN homed in a 2G wireless network, without requiring WIN operations and configured MSCe translations for routing the call request. The HLR may still determine whether the subscriber has subscribed to the IMS services, but the HLR-based subscriber profile is enhanced with new IMS-related subscriber information. An enhanced MSCe receives or "understands" the new IMS-related subscriber information from the HLR and, in response, prevents invocation of WIN operations and associated translations. Enhanced ANSI-41 MAP operations and a new ANSI-41 parameter allow the MSCe to inform the HLR that MSCe is capable of receiving the new IMS-related subscriber information. The enhanced MSCe routes the call origination request from a PSTN based upon the new IMS-related subscriber information received from the HLR. The enhanced MSCe may also communicate with a DNS, wherein the DNS may be used for traffic distribution (load balancing). The teachings of the present invention thus provide a more effective mechanism for traffic distribution to the IMS entry points and for a faster call setup when re-routing from the MSCe to an IMS network is required.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of routing a call request from a Mobile Switching Center emulation (MSCe) in a wireless network to an Internet Protocol Multimedia Subsystem (IMS) network associated with the wireless network, the IMS network including a first entry point and a second entry point, the call request being related to a subscriber in the wireless network, the subscriber being assigned a Mobile Directory Number (MDN) that is homed on the MSCe, the method comprising the steps of:
    the MSCe receiving the call request;
    the MSCe communicating with a Home Location Register (HLR) in the wireless network; and
    upon receiving a response from the HLR, the response including a Session Initiation Protocol (SIP) Uniform Resource Identifier (URI) of the subscriber along with an Internet Protocol (IP) address of the second entry point for the IMS network, the MSCe routing the call request to the second entry point without invoking a Wireless Intelligent Network (WIN) operation and an associated routing number translation, the MSCe routing the call request by sending a SIP INVITE to the IP address of the second entry point.

2. The method of claim 1, wherein the MSCe receiving the call request includes:
    the MSCe receiving the call request in the form of a Call Origination request from a Public Switched Telephone Network (PSTN), wherein the Call Origination request contains the MDN in a Called Party Number (CdPN) element thereof.

3. The method of claim 1, wherein the MSCe communicating with the HLR is via American National Standards Institute-41 (ANSI-41) Mobile Application Part (MAP) operations.

4. The method of claim 1, wherein the MSCe communicating with the HLR includes:
    the MSCe sending an American National Standards Institute-41 (ANSI-41) Mobile Application Part (MAP) Location Request (LOCREQ) INVOKE to the HLR, the MAP LOCREQ INVOKE containing at least an MDN-bearing Dialed Digits parameter and an enhanced TransactionCapability parameter indicating that the MSCe is capable of supporting an enhanced TerminationList parameter in the response from the HLR;
    the HLR determining whether the subscriber has subscribed to IMS services; and
    if the subscriber has subscribed to IMS services, the HLR sending as the response an ANSI-41 MAP LOCREQ RETURN RESULT to the MSCe, wherein the MAP LOCREQ RETURN RESULT contains the enhanced TerminationList parameter with an IMSTermination parameter, wherein the IMSTermination parameter includes the IP address of the second entry point.

5. The method of claim 4, wherein an IMS field included in the TransactionCapability parameter indicates, to the HLR, that the MSCe is capable of supporting the enhanced TerminationList parameter from the HLR.

6. The method of claim 4, wherein the SIP INVITE is constructed by the MSCe using the SIP URI of the subscriber.

7. The method of claim 4, wherein the IMSTermination parameter is constructed by the HLR using an IMSInformation parameter in a subscriber profile stored therein, wherein the IMSInformation parameter includes the IP address of the second entry point.

8. The method of claim 7, wherein
    the second entry point is an Interrogating Call Session Control Function (I-CSCF).

9. A method comprising:
    receiving a call request at a Mobile Switching Center emulation (MSCe) in a wireless network to an IP Multimedia Subsystem (IMS) network associated with the wireless network, the IMS network including a first entry point and a second entry point, the call request being related to a subscriber in the wireless network, and the subscriber being assigned a Mobile Directory Number (MDN) that is homed on the MSCe;

the MSCe communicating with a Home Location Register (HLR) in the wireless network; and without invoking a Wireless Intelligent Network (WIN) operation and based on the call processing information received from the HLR, the received call processing information including a Session Initiation Protocol (SIP) Uniform Resource Identifier (URI) of the subscriber along with an Internet Protocol (IP) address of the second entry point for the IMS network, the MSCe routing the call request by sending a SIP INVITE to the IP address of the second entry point.

10. The method of claim 9, wherein the call processing information from the HLR contains one of:

a Session Initiation Protocol (SIP) Uniform Resource Identifier (URI) of the subscriber, and the SIP URI of the subscriber and an American National Standards Institute-41 (ANSI-41) parameter, wherein the ANSI-41 parameter provides the MSCe with routing information related to either the first entry point or the second entry point for the IMS network.

11. A method involving American National Standards Institute-41 (ANSI-41) Mobile Application Part (MAP) based signaling between a network switch and a Home Location Register (HLR) in a wireless network, the network switch using an ANSI-41 MAP LocationRequest (LOCREQ) INVOKE operation to obtain call treatment information from the HLR for a call request received by the network switch for a subscriber in the wireless network, the method comprising:

enhancing a TransactionCapability parameter in the MAP LOCREQ INVOKE operation to allow the network switch to indicate, to the HLR, that the network switch is capable of supporting an enhanced TerminationList parameter in a MAP LOCREQ RETURN RESULT operation by the HLR, the call treatment information in the enhanced TerminationList parameter allowing the network switch to route the call request to a second one of a first and second entry point for an Internet Protocol Multimedia Subsystem (IMS) network without performing a Wireless Intelligent Network (WIN) operation, the call treatment information including a Session Initiation Protocol (SIP) Uniform Resource Identifier (URI) of the subscriber along with an Internet Protocol (IP) address of the second entry point.

12. The method of claim 11, wherein enhancing the TransactionCapability parameter further comprises:

including an IMS field in the TransactionCapability parameter to indicate, to the HLR, that the network switch is capable of supporting the enhanced TerminationList parameter from the HLR.

13. A method involving American National Standards Institute-41 (ANSI-41) Mobile Application Part (MAP) based signaling between a network switch and a Home Location Register (HLR) in a wireless network, the network switch using an ANSI-41 MAP LocationRequest (LOCREQ) INVOKE operation to obtain call treatment information from the HLR for a call request received by the network switch for a subscriber in the wireless network and the HLR using an ANSI-41 MAP LOCREQ RETURN RESULT operation to provide the call treatment information, the method comprising:

enhancing a TerminationList parameter in the MAP LOCREQ RETURN RESULT with information that allows the network switch to route the call request to a second one of a first and second entry point for an Internet Protocol Multimedia Subsystem (IMS) network without performing a Wireless Intelligent Network (WIN) operation, the call treatment information including a Session Initiation Protocol (SIP) Uniform Resource Identifier (URI) of the subscriber along with an Internet Protocol (IP) address of the second entry point.

14. A Mobile Switching Center emulation (MSCe) for routing a call request for a subscriber in a wireless network to an Internet Protocol Multimedia Subsystem (IMS) network associated with the wireless network, the IMS network including a first entry point and a second entry point, the MSCe configured to:

receive the call request;

communicate with a Home Location Register (HLR) in the wireless network; and in response to the call-processing information from the HLR, the call-processing information including a Session Initiation Protocol (SIP) Uniform Resource Identifier (URI) of the subscriber along with an Internet Protocol (IP) address of a second one of a first and second entry point for the IMS network, route the call request to the second entry point for the IMS network without invoking a Wireless Intelligent Network (WIN) operation and associated routing number translation by sending a SIP INVITE to the IP address of the second entry point.

15. The MSCe of claim 14, wherein the MSCe is configured to construct the SIP INVITE using the SIP URI of the subscriber.

16. The MSCe of claim 15, wherein the entry point is an Interrogating Call Session Control Function (I-CSCF).

17. The MSCe of claim 14, wherein the MSCe is configured to communicate with the HLR by sending an American National Standards Institute-41 (ANSI-41) Mobile Application Part (MAP) LocationRequest (LOCREQ) INVOKE to the HLR, the MAP LOCREQ INVOKE containing an enhanced TransactionCapability parameter indicating that the MSCe is capable of supporting an enhanced TerminationList parameter in the call-processing information from the HLR.

18. A Home Location Register (HLR) to provide call-processing information to a Mobile Switching Center emulation (MSCe) in a wireless network to enable the MSCe to route a call request for a subscriber in the wireless network to an Internet Protocol Multimedia Subsystem (IMS) network associated with the wireless network, the IMS network including a first entry point and a second entry point, the HLR being configured to:

receive an American National Standards Institute-41 (ANSI-41) Mobile Application Part (MAP) LocationRequest (LOCREQ) INVOKE from the MSCe, the MAP LOCREQ INVOKE containing an enhanced TransactionCapability parameter indicating that the MSCe is capable of supporting an enhanced TerminationList parameter in the call-processing information from the HLR;

determine whether the subscriber has subscribed to IMS services; and if the subscriber has subscribed to IMS services, send the call-processing information to the MSCe via an ANSI-41 MAP LOCREQ RETURN RESULT, the MAP LOCREQ RETURN RESULT containing the enhanced TerminationList parameter with information that allows the MSCe to route the call request to the second entry point for the IMS network without performing a Wireless Intelligent Network (WIN) operation, the call-processing information including a Session Initiation Protocol (SIP) Uniform Resource Identifier (URI) of the subscriber along with an Internet Protocol (IP) address of the second entry point.

19. The HLR of claim 18, wherein the enhanced TerminationList parameter includes an IMSTermination parameter, wherein the IMSTermination parameter includes the IP address of the second entry point.

20. A system comprising:
a Home Location Register (HLR) containing subscription-related information for a subscriber in a wireless network; and
a Mobile Switching Center emulation (MSCe) in communication with the HLR to receive call-processing information from the HLR when routing a call request for the subscriber, upon receiving the call request for the subscriber, the MSCe being configured to:
communicate with the HLR to receive the call-processing information from the HLR, and
in response to the call-processing information from the HLR, the call-processing information including a Session Initiation Protocol (SIP) Uniform Resource Identifier (URI) of the subscriber along with an Internet Protocol (IP) address of a second one of a first and second entry point for the IMS network, route the call request to the second entry point without invoking a Wireless Intelligent Network (WIN) operation and associated routing number translation by sending a SIP INVITE to the IP address of the second entry point.

21. The system of claim 20, further comprising:
an Interrogating Call Session Control Function (I-CSCF) in communication with the MSCe and configured to serve as the second entry point for the IMS network, wherein the I-CSCF is associated with the IP address to receive the call request routed to the IP address by the MSCe.

* * * * *